Jan. 16, 1968 P. H. McGARRELL 3,364,340
PULSE GENERATING CIRCUIT
Original Filed March 31, 1958 5 Sheets-Sheet 3

INVENTOR.
Paul Harry McGarrell
BY
ATTORNEYS

Jan. 16, 1968  P. H. McGARRELL  3,364,340
PULSE GENERATING CIRCUIT
Original Filed March 31, 1958  5 Sheets-Sheet 4

INVENTOR.
Paul Harry McGarrell
BY
ATTORNEYS

Jan. 16, 1968     P. H. McGARRELL     3,364,340

PULSE GENERATING CIRCUIT

Original Filed March 31, 1958     5 Sheets-Sheet 5

INVENTOR.
Paul Harry McGarrell
BY
ATTORNEYS

United States Patent Office 3,364,340
Patented Jan. 16, 1968

3,364,340
PULSE GENERATING CIRCUIT
Paul Harry McGarrell, South Euclid, Ohio, assignor, by mesne assignments, to The Bunker-Ramo Corporation, Stamford, Conn., a corporation of Delaware
Continuation of application Ser. No. 89,546, Feb. 15, 1961, which is a division of application Ser. No. 725,414, Mar. 31, 1958, now Patent No. 3,079,522, dated Feb. 26, 1963. This application Dec. 22, 1966, Ser. No. 605,138
18 Claims. (Cl. 235—92)

This application is a continuation of application Ser. No. 89,546, filed Feb. 15, 1961, which is a division of my copending application entitled, "Automatic Machine Tool Control," Ser. No. 725,414, filed Mar. 31, 1958, now Patent No. 3,079,522.

This invention relates to a pulse generating circuit and more particularly to a pulse generating circuit arranged to complete a cycle of operation in response to application of a certain number of input pulses thereto and arranged to generate in each cycle of operation a train of output pulses equal in number to a controllable fraction of the number of input pulses applied during the cycle. The circuit is comparatively simple and requires a minimum number of component parts and yet is efficient, accurate and reliable in operation. It is particularly advantageous in using a decimal code and in permitting the direct control thereof from a reading means, such as a tape reader, operative to read a block of indicia placed on the tape according to a decimal code.

The circuit of this invention has other applications but was particularly designed for use in a system for the automatic control of machine tools. A complete automatic control system is disclosed in my Patent No. 3,079,522. In the operation of the complete system, servo systems are controlled in accordance with a block of information on a section of punched tape, to move a machine tool element a certain distance along or about each of a plurality of axes of movement, in a certain interval of time. For example, in milling a particular part a cutting tool may be moved vertically a distance of 1.2547 inches in an interval of five seconds and in one horizontal direction a distance of 0.0036 inch. In the same five second interval, a worktable of the machine may be moved in a transverse horizontal direction a distance of 2.7405 inches and a workholder on the worktable may be moved about a horizontal axis through an angular distance of 3°. Such movements are obtained by punching holes at appropriate positions in the tape fed to the tape reader.

The complete machine tool control system comprises a plurality of pulse generating circuits each of which corresponds to one of the directions of movement. Each circuit generates in a certain time interval a train of pulses proportional to the desired amount of movement. In the above example, the pulse generating circuit which controls vertical movement of the cutting tool may generate 12,547 pulses in an interval of five seconds and in the same interval, the pulse generating circuit used to control horizontal movement of the cutting tool may generate only 36 pulses.

Various systems may be used to cause movement of the machine tool elements in proportion to the numbers of pulses in the pulse trains. Preferably, the pulse trains are used to gradually shift the phase of 200 cycle square wave command signals each of which is applied to a phase detector. Each phase detector compares the phase of the 200 cycle square wave command signal with the phase of a 200 cycle square wave reference signal, to control a servo system which moves a machine tool element along or about one axis. As the element moves, an error device in the form of a resolver responds to the movement and shifts the phase of the reference signal toward that of the command signal. After effecting the control in accordance with one train of pulses, the total accumulative phase shifts of both the command and reference signals are equal to each other and are proportional to the movement of the machine tool element.

To generate the 200 cycle square wave command signal, a divide-by-500 frequency divider or count-down circuit may be provided having an input coupled through a gate circuit and through an add circuit to a fixed frequency 100 kc. pulse signal source. Prior to reading of a block of taped information, the 200 cycle command signal is generated solely from the 100 kc. pulse signal and is of fixed phase. After a block of information is read, the corresponding train of pulses from the pulse generating circuit is applied to the input of the frequency divider, either through the gate circuit or through the add circuit, to shift the phase in one direction or the other. When applied to the gate circuit, each pulse deletes one of the pulses from the 100 kc. source to create a certain phase lag in the output of the frequency divider. When applied to the add circuit, each command pulse is applied to the frequency divider at a time between pulses from the 100 kc. source to create a certain phase lead in the output of the divider. After application of a train of pulses, the phase of the 200 cycle command signal is shifted in one direction or the other by a total amount exactly proportional to the number of pulses in the train. The gate circuit and the add circuit are selectively energized in accordance with sign information on the tape.

The pulse train generator of this invention comprises a counter circuit arranged to respond to a series of input pulses to periodically complete a cycle of operation during which the circuit generates four series of pulses with the numbers of pulses in the series being selectively addable to produce any number from 1 through 9. Preferably, there are five pulses in one series, two pulses in another, and one pulse in each of the other two series. The pulses of each series are non-coincident with the pulses of each of the other series. With this arrangement, the series of pulses may be selectively applied to a common output circuit, to obtain any desired number of pulses, from 0 through 9, in each cycle of operation.

Each counter includes means for generating an output signal in response to application of every tenth input pulse thereto, and a series of such counters are connected in cascade, with the output signal from each counter being applied to the input of the succeeding counter. Thus each of the counter circuits, except the final circuit, is operated at a rate equal to ten times the rate of operation of the next succeeding circuit.

By way of example, five counter circuits may be provided, each corresponding to a digit of a five digit decimal number representing the number of pulses in the train of pulses to be generated. With this arrangement, a cycle of operation is completed following the application of 100,000 input pulses to the first counter. To obtain a cycle of operation having a duration of five seconds, as in the above example, a 20 kc. pulse signal may be applied to the input.

To obtain the output signal, gate circuits are used to apply the series of pulses from the counters to a common output circuit, there being four gate circuits associated with each of the five counter circuits. By selective control of the gate circuits, any number of pulses may be generated during the cycle of operation, from 0 to 99,999, when five counter circuits are used.

The pulse generating circuit as above described has a number of advantages. An important advantage is that the gate circuits may be directly controlled according to a decimal code, in response to information disposed on the tape or other record medium according to a decimal code. Thus punched holes or other indicia may be located at certain positions in groups on the tape or other record medium with each group corresponding to a digit of a plural digit decimal number. The decimal code is particularly advantageous in simplifying preparation of the tape or other medium and is also advantageous in permitting one to readily check the operation of the system, by comparing its operation with the information on the tape.

Another advantage of the pulse generating system is that the distribution of the pulses over the cycle of operation is substantially uniform, and it is possible to obtain a substantially uniform movement of the machine tool element or other device which is controlled.

Further features of the invention reside in the particular construction of the counting circuits and in their interconnection, to develop the non-coincident pulses which may be directly applied through gate circuits to the common output circuit.

This invention contemplates other and more specific objects, features and advantages which will become more fully apparent from the following detailed description taken in conjunction with the accompanying drawings which illustrate a preferred embodiment and in which.

Figure 1:
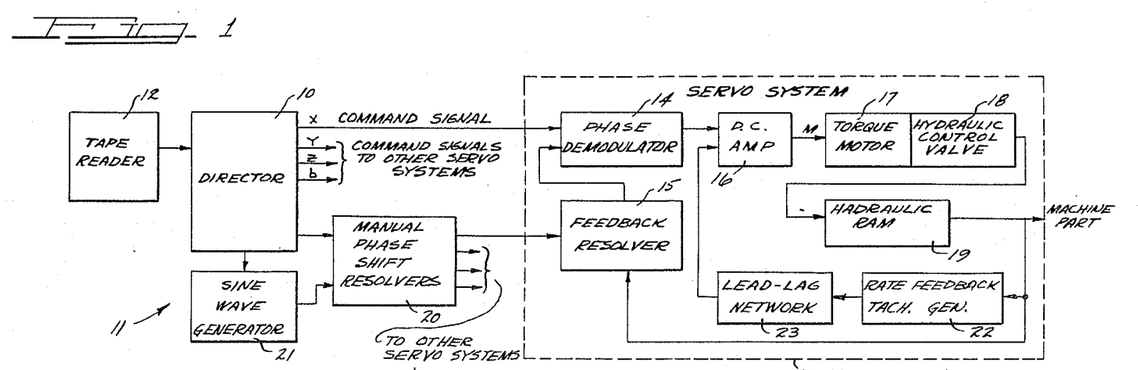
FIGURE 1 is a block diagram of a machine tool control system including a tape reader and a director in which the pulse generating circuit of this invention is used.

The pulse generating circuit of this invention is incorporated in a director 10 of a machine tool control system generally designated by reference numeral 11 in FIGURE 1. Although the pulse generator circuit may be used in other applications, it is believed that its operation and advantages will be best understood by first considering the operation of the overall system.

In general, the director is controlled by a tape reader 12 which sequentially reads blocks of information from sections of punched tape. The director generates a plurality of 200 cycle square wave command signals, each of which is applied to a servo system which actuates a machine part, one servo system 13 being shown diagrammatically in FIGURE 1.

After the tape reader reads a block of information from a section of punched tape, the director operates for a certain time interval to gradually shift the phase of each 200 cycle square wave command signal in accordance with information on the tape. One command signal is applied to a phase demodulator 14 in the servo system 13, which compares the phase of the command signal with the phase of a 200 cycle square wave reference signal from a feedback resolver 15. The output of the phase demodulator 14 is applied through a DC amplifier 16 to a torque motor 17 which controls a valve 18 to control a hydraulic ram 19 and thereby actuate the machine part.

As the machine part moves, the feedback resolver 15 is actuated to shift the phase of the reference signal toward that of the command signal. After effecting the control in accordance with one block of information, the total cumulative phase shift of the reference signal which is proportional to the movement of the machine part, is equal to the total cumulative phase shift of the command signal.

A control signal is applied to the feedback resolver 15 from one of a plurality of manual phase shift resolvers 20, to provide a manual override on the system.

To provide synchronized operation, a sine wave signal is applied to the manual phase shift resolvers from a sine wave generator 21 which receives a reference signal from the director 10.

The servo system 13 may preferably include a rate feedback feature to improve speed of response and stability. In particular, the machine part drives a rate feedback tachometer generator, the output of which is applied through an adjustable lead-lag phase adjusting network 23 to the input of the DC amplifier 16.

Figure 2:
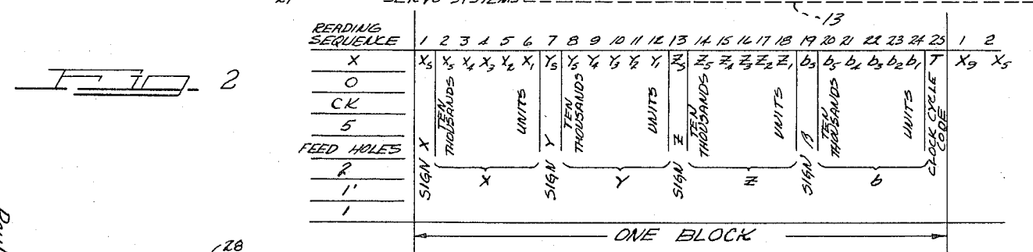
FIGURE 2 is a diagram showing the format of a section of tape used in controlling the system of FIGURE 1.

FIGURE 2 shows the format of a section of tape used in controlling the system of FIGURE 1. One or more holes are punched along each of twenty-five transverse lines which are spaced along the tape, such lines or groups of holes being read by the tape reader in the sequence as indicated. The first six groups 1–6 control an "x" channel of the system to control movement of the machine along or about one axis, group 1 being used to control the direction of movement and groups 2–6 being used to control the magnitude of movement. For example, groups 1–6 may control the vertical movement of a cutting tool. Groups 7–12 control a "y" channel and may control movement of the cutting tool in one horizontal direction. Groups 13–18 control a "z" channel and may control movement of a worktable of the machine in a transverse horizontal direction. Groups 19–25 control a "b" channel and may control movement of a workholder on the worktable about a horizontal axis.

The last group, group 25, is used to control the time interval during which the movements are accomplished. For example, the time interval may be selected to be one-half second, one second, two seconds, five seconds, ten seconds, twenty seconds, forty seconds, eighty seconds, one hundred and sixty seconds or three hundred and twenty seconds.

The director 10 comprises a plurality of pulse generating circuits constructed according to this invention, each of which generates in a certain time interval a train of pulses proportional to the desired amount of movement. For example, milling of a particular part may require vertical movement of a cutting tool a distance of 1.2547 inches while the cutting tool is simultaneously moved horizontally a distance of 0.0036 inch, and it may be desired to perform the cutting operation in a time interval of five seconds. To perform this operation, the pulse generating circuit of one channel may generate 12,547 pulses in an interval of five seconds while the pulse generating circuit of a second channel generates only 36 pulses in the same time interval. Such trains of pulses are used to phase modulate the 200 cycle square wave command signals. It is believed that the operation and advantages of the pulse generating circuits of this invention will be best understood by first describing the arrangement by which the pulse trains are used to cause phase modulation of the 200 cycle square wave command signals.

Figure 3:
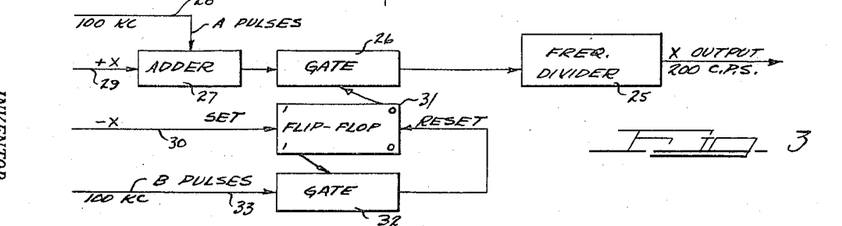
FIGURE 3 is a schematic diagram of a phase modulator circuit used in the final output stages of the director of FIGURE 1.

FIGURE 3 shows a phase modulator circuit which forms the final output stage for each of the channels of the director 10. This circuit comprises a frequency divider 25 having an input connected through a gate circuit 26 and an adder circuit 27 to a source of 100 kc. pulses applied through line 28. Prior to reading of a block of tape information, the frequency divider 25 is controlled solely by the 100 kc. pulses and the output of the frequency divider is a 200 cycle square wave signal of fixed phase.

When a block of information is read, a train of command pulses is applied either through a conductor 29 to the adder circuit 27 or through a conductor 30 to a flip-flop circuit 31 which controls the gate circuit 26. When a train of command pulses is applied through conductor 29, each pulse is applied to the frequency divider 25 at a time between pulses from the 100 kc. source to create a certain phase lead in the output of the divider. On the other hand, when a train of command pulses is applied through conductor 30, each pulse operates the flip-flop circuit 31 to close the gate 26 and delete one of the 100 kc. pulses. Thus a certain phase lag is created in the output of the frequency divider.

The command pulses, whether applied over conductor 29 or conductor 30 are out of phase with the 100 kc. pulses applied through conductor 28, which may be designated as "A" pulses. To properly operate the gate 26 so as to delete only one of the 100 kc. "A" pulses in response to each command pulse applied over conductor 30, it is necessary that the gate 26 be closed for a certain time interval. This is accomplished by applying a reset signal to the flip-flop circuit 31 through a gate circuit 32 having an input connected through a conductor 33 to a source of 100 kc. pulses which are out of phase with those applied to conductor 28, and may be designated as "B" pulses.

In operation, the flip-flop circuit 31 is normally in a reset condition and the gate 26 is open. When a command pulse is applied through conductor 30, the flip-flop circuit 31 is then placed in a set condition and the gate circuit 26 is closed to delete the next "A" pulse applied from conductor 28. At the same time, the gate 32 is opened and the next "B" pulse applied through conductor 33 serves to reset the flip-flop 31, to again open the gate 26 while closing the gate 32.

Figure 4:
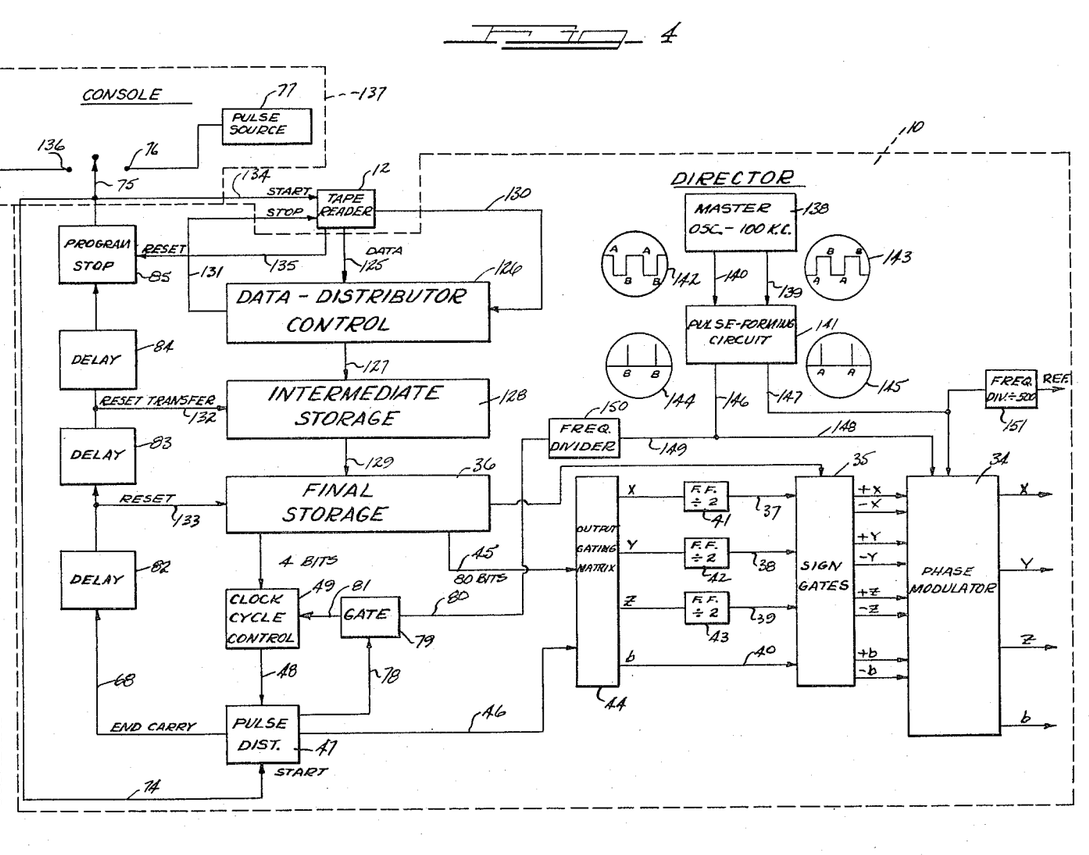
FIGURE 4 is a schematic diagram showing the circuit of the director of FIGURE 1 (except for the phase modulator shown in FIGURE 3) and also showing the connection of the director to the tape reader.

Referring now to the schematic diagram of the director, FIGURE 4, four phase modulators such as shown in FIGURE 3 are incorporated in a phase modulator section 34, to form signal output stages of the director. The inputs of the phase modulators are connected through sign gates 35, controlled by a final storage unit 36, to conductors 37, 38, 39 and 40 on which trains of command pulses are generated for the $x$, $y$, $z$ and $b$ channels, respectively. In accordance with operation of the sign gates 35, the trains of command pulses are applied either to the pulse addition or deletion circuits of the phase modulators, to produce either a phase lead or a phase lag in the 200 cycle square wave command signals generated thereby.

Conductors 37, 38 and 39 are connected through divide-by-two flip-flops 41, 42 and 43 to $x$, $y$ and $z$ outputs of an output gating matrix 44, conductor 40 being directly connected to a $b$ output of the gating matrix 44. Flip-flops 41–43 are not necessarily provided and are used in a particular system only to obtain a desired proportion between the number of pulses in a command train and the corresponding movement of a machine tool element.

The output gating matrix is connected through a line or cable 45 to the final storage section 36 and is also connected through a line or cable 46 to a pulse distributor 47. The pulse distributor 47 operates as a counter circuit and responds to input pulses applied over line 48 from a clock cycle control circuit 49 to complete a cycle of operation in response to application of a certain number of input pulses thereto. During each cycle of operation, the pulse distributor 47 develops a plurality of series of pulse trains which are applied through the line or cable 46 to the gating matrix. At the same time, control signals are applied over the line or cable 45 from the final storage section 36, to control the application of such pulses to the outputs of the matrix. With this arrangement, there is developed at each output of the gating matrix in each cycle of operation of the pulse distributor 47 a train of output pulses equal in number to a controllable fraction of the number of input pulses applied to the pulse distributor through line 48 from the clock cycle control 49.

Figure 5:
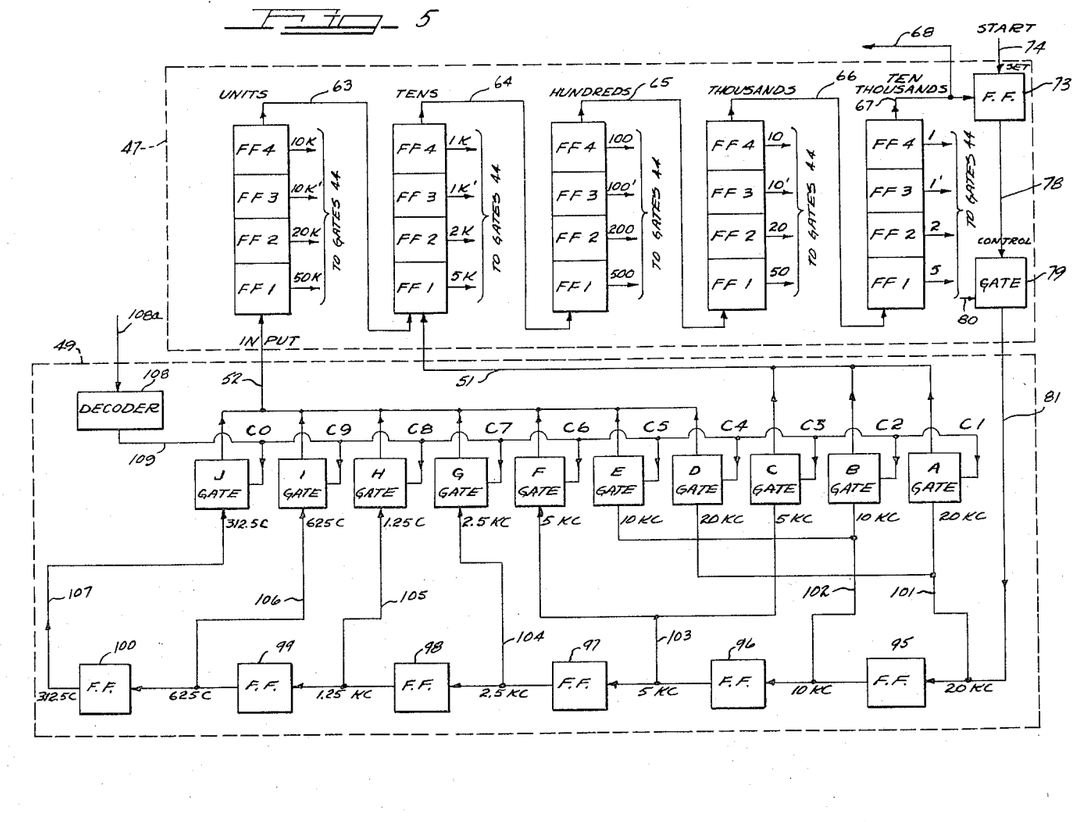
FIGURE 5 is a schematic diagram of a clock cycle control and pulse distributor used in the director, forming a portion of the pulse generator circuit of this invention.
Figure 7:
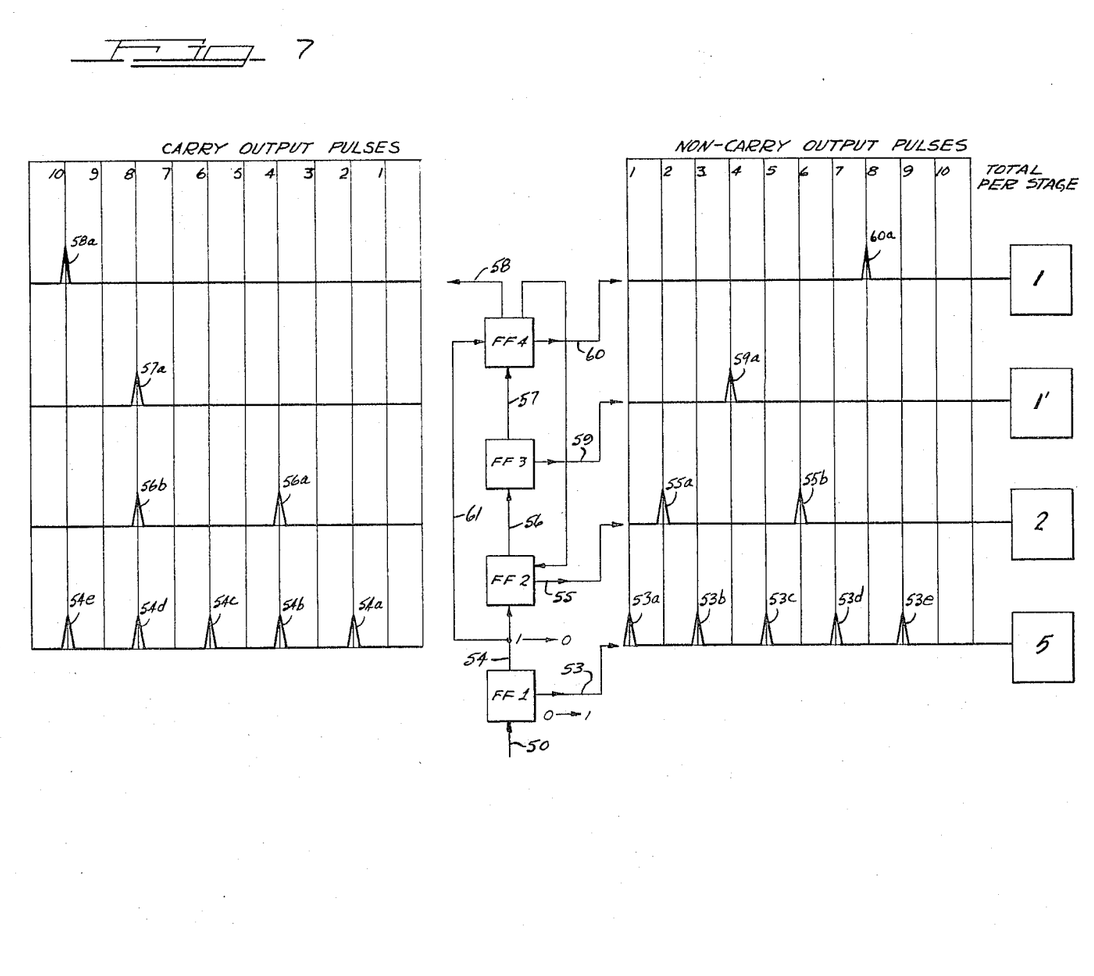
FIGURE 7 is a schematic diagram showing the circuit of a decade counter used in the pulse distributor of FIGURE 5, and also showing the waveforms developed at various portions of the circuit.

The pulse distributor 47 which is shown in greater detail in the dashed line block 47 of FIGURE 5 may, for example, consist of five cascaded decade counters each being of the type shown in greater detail in FIGURE 7. Each decade is constructed of four interchangeable plug-in and preferably transistorized module flip-flop or bistable circuits, plus the external feedback connections shown in FIGURE 7. These four flip-flops are indicated for each decade counter in FIGURE 7 by the blocks FF1, FF2, FF3 and FF4, respectively. Each of these flip-flop circuits, as is well known in the art, has two stable electrical states and may be triggered from one state to the other by an input pulse which may be applied to FF1, for example, over line 50, or, as shown in FIGURE 5, over lines 51 and 52. The binary zero representing state of the flip-flop may be termed its reset condition whereas the binary one representing state of the flip-flop may be termed its set condition. The line 50 is connected to the "binary input terminal" of FF1, whereby this phase is meant the terminal so connected internally that an applied pulse will change the state of the flip-flop regardless of which of its two states it is in. When FF1 is in the reset or zero representing condition, an input pulse applied over line 50 will flip the circuit to its set condition and in so doing, the circuit will emit what may be termed a non-carry output pulse over a line 53. That is to say, line 53 is connected to the "set" output terminal which is a terminal so connected that a pulse appears at it only when the flip-flop is changed from its reset to its set condition. This first output pulse is indicated as pulse 53a in the waveform diagram at the right of FIGURE 7 which shows all of the non-carry output pulses emitted from each of the four cascaded flip-flops as the decade counts the input pulses from one to ten. When a second input pulse is applied to FF1, over line 50, it returns the FF1 flip-flop from its set condition to its reset or zero representing condition, and the FF1 flip-flop emits a carry pulse over line 54. That is to say, line 54 is connected to the "reset" output terminal of FF1 which is a terminal at which a pulse appears only when the flip-flop is changed from its set to its reset condition. This carry pulse is applied to the binary input terminal of FF2 thereby changing its state from reset to set. Flip-flop FF2, since it was changed from a zero representing to a one representing state, emits a non-carry pulse over line 55 which is shown in the waveform diagram as pulse 55a. The carry pulse emitted by FF1 whenever its state is changed from a one to a zero representing condition is also applied over a line 84 to the reset input terminal of FF4 for a purpose to be described below. By "reset input terminal," of course, is meant the terminal so connected that an applied pulse wil change the state of the flip-flop only if it is already in a set condition so that it may be reset. Similarly, the term "set input terminal" will be used herein to mean the terminal so connected that an applied pulse would change the state of the flip-flop only if it is already reset so that it may be set. The carry pulses emitted from FF1 when the second and succeeding even numbered pulses are applied are indicated in the waveform diagram at the left of FIGURE 7 labelled "carry output pulses." It will, of course, be understood that the reset or output pulse terminal of FF1 is connected by line 54 to the binary input of FF2, the carry output terminal of FF2 being connected by line 56 to the binary input terminal of FF3, the carry output terminal of FF3 being connected by line 57 to the binary input terminal of FF4 and the reset or carry output terminal of FF4 providing an output along line 58. It will be noted that the term "carry output terminal" is used synonymously with the term "reset output terminal" and that the term "non-carry output terminal" is used synonymously with the term "set output terminal."

The output pulses appearing at non-carry output lines 53, 55, 59 and 60 from the respective flip-flops as a sequence of ten input pulses is applied to line 50 are illustrated in the appropriately labelled waveform diagram at the right of FIGURE 7. Thus pulses 53a, 53b, 53c, 53d and 53e appear on line 53, pulses 55a and 55b appear on line 53, etc. The output pulses appearing on carry output lines 54, 56, 57 and 58 of the respective flip-flops are similarly illustrated in the appropriately labelled waveform diagram at the left of FIGURE 6.

When the entire decade is in its reset condition, all of the flip-flops are in the zero representing state and the decade is ready to begin counting. The first pulse applied, as noted above, changes FF1 to its set state and provides output pulse 53a. The second pulse applied changes FF1 back to its zero or reset state and the carry pulse 54a along line 54 changes FF2 to its set or one state, thereby providing non-carry pulse 55a. The third pulse applied changes FF1 to its one state, thereby providing non-carry output pulse 53b. The fourth pulse applied changes FF1 back to zero, its carry pulse changes FF2 back to zero and its carry pulse, in turn, changes FF3 from zero to one, thereby providing non-carry output pulse 59a. The fifth pulse applied simply changes FF1 to its one state and provides non-carry pulse 53c. The sixth pulse applied changes FF1 from one to zero, thereby providing a carry pulse which changes FF2 from zero to one, hence providing non-carry pulse 55b. The seventh pulse applied simply changes FF1 from zero to one, thereby providing non-carry output pulse 53d. At the count of eight, FF1 goes from one to zero, providing carry pulse 54d which is applied over line 54 to the binary input of FF2 and is also applied over line 61 to the reset input terminal of FF4. By reset input terminal, as noted above, is meant the input terminal so connected that an applied pulse will change the state of the flip-flop from one to zero only if the flip-flop is originally in a one state. FF4, however, has already been reset and is in its zero state, therefore neither pulse 54d nor previous carry pulses have any effect on FF4. However, at the count of eight, the pulse 54d on carry line 54, changes FF2 to zero which, in turn, changes FF3 to zero and emits pulse 57a which is applied to the binary input of FF4 to change it to the set or one representing condition and provide non-carry output pulse 60a. At the count of nine, FF1 is simply changed from its zero to its one representing state and provides non-carry output pulse 53e. At the count of ten, FF1 is changed from its one to its zero condition, thereby providing carry output pulse 54e. This output pulse, which is applied over a line 61 to FF4, now finds FF4 in its one or set condition and resets FF4 to provide output carry pulse 58a on line 58. The carry pulse 54e which is applied over line 61 to FF4 is, of course, also applied over line 54 to FF2 and would normally change its state from zero to one. However, this action is prevented by applying a signal over a line 62 from FF4 to FF2. Line 62 is connected to sense the one representing state of FF4 and to apply a voltage to FF2 such that whenever FF4 is in its one representing, or set state, FF2 will be held in its zero representing state in spite of the application to it of a trigger pulse such as 54e. The detailed circuitry by which this latter action per se is accomplished is well known in the art and need not be further described here.

It is thus seen that the four cascaded flip-flops are connected so that when they are all initially reset to zero by any conventional means not shown and ten input pulses are applied to line 50, the first nine output pulses will change the internal states and produce nine non-carry output pulses, whereas the tenth input pulse will not produce a non-carry pulse but will produce an end-carry output pulse such as pulse 58a at output line 58.

In FIGURE 5 five decade counters of the type shown in detail in FIGURE 7 are arranged in cascaded relationship. That is to say, the units decade is provided with a carry output pulse line 63 which is connected to the binary input terminal of the tens decade. Thus, after ten pulses have been applied over line 52 from the clock cycle control 49 to the units decade, the units decade at the tenth pulse will emit a pulse over a line 63 which is applied as an input to the tens decade. The tens decade is, in turn, provided with a carry output pulse line 64 which connects to the binary input of the hundreds decade. Similarly, lines 65 and 66 connect the hundreds, the thousands and the ten thousands decades in cascade, whereas the ten thousands decade is provided with a carry output pulse line 67 which connects to a line 68 for a purpose discussed in connection with FIGURE 4.

From the foregoing, it is apparent that when input pulses are applied to line 52, the units decade will emit a carry pulse at the tenth pulse, the tens decade will emit a carry pulse at the one hundredth pulse, the hundreds decade will emit a carry pulse at the thousandth pulse, the thousands decade will emit a carry pulse at the ten thousandth pulse, and the ten thousands decade will emit a carry pulse at the hundred thousandth pulse. Thus, if for example, the frequency of the input pulses applied to line 52 is 312.5 cycles per second, the end carry pulse emitted from line 67 will be emitted 320 seconds after the first input pulse is applied to the units decade over line 52. It should also be noted that input line 51 from the clock cycle control is applied as shown in FIGURE 5 directly to the trigger input of the tens decade rather than to the units decade. Hence, for pulses applied over line 51, the pulse distributor counting chain will count to ten thousand rather than to one hundred thousand, as is the case when the input is applied directly to the units of decade over line 52. For example, if the frequency of the input pulses applied over line 51 is twenty kilocycles per second, the counter will count to ten thousand and the output pulse on line 67 will appear one-half second after the first input pulse is applied. It is the function of the clock cycle control to apply input pulses of the appropriate frequency to the appropriate line 51 or 52 of the pulse distributor counter so that the counter will provide an output pulse over line 68 at the end of the clock cycle time called for by the clock cycle code letter stored in final storage. The precise manner in which the clock cycle control accomplishes this will be described below.

It should first be noted here, however, that while the decade counters of the pulse distributor are counting from one to ten thousand, or from one to one hundred thousand, as the case may be, at a rate determined by the frequency of the input pulses from the clock cycle control, each stage of each decade counter will also provide a non-carry output pulse at the respective terminals 53, 55, 59 and 60 thereof, whenever the particular stage is set or changed from a zero to a one condition as explained in detail above in connection with FIGURE 7.

Furthermore, referring to the graphical illustration of the time distribution of these non-carry output pulses shown in FIGURE 7, it will be noted that the total number of non-carry output pulses provided by each respective flip-flop of the decade as the decade counts from one through ten is indicated by the numerals in the blocks at the right of FIGURE 7 as 1, 1', 2, and 5, respectively. Thus it will be noted that FF1 produces five such non-carry output pulses, FF2 produces two such non-carry output pulses, FF3 produces one such non-carry output pulse and that FF4 also produces one such non-carry output pulse. Furthermore, no non-carry pulse from any given flip-flop is ever time coincident with any other non-carry pulse from any other flip-flop of the same decade and no non-carry pulse from any flip-flop of a given decade is ever time coincident with that decade's final output carry pulse. Since the carry output pulse from one decade is the trigger input pulse to the next decade, it follows that as the complete counter goes through a complete count there will be one and only one non-carry output pulse from some stage of some decade for each input trigger pulse counted except the last which produces the final output carry pulse. Furthermore, no two non-carry output pulses will be time coincident. Even more important, these non-carry output pulses will be numerically distributed among the stages of each decade as indicated by the numbers associated with lines from flip-flops FF1–FF4 in FIGURES 5 and 6. That is, during a count of one hundred thousand pulses, FF1 of the units decade produces fifty thousand non-carry output pulses, FF2 twenty thousand, etc. Of course, in the ten thousands decade, FF1 produces only 5 non-carry pulses, FF2 produces 2, FF3 and FF4 one each. This particular numerical distribution is important in that the four series of pulses from each set of four flip-flops are selectively addable to produce any number from one through nine. Because of this, and because the pulses are non-coincident, they can be directly applied to a common output circuit through a group of selectively operable gate circuits in the gating matrix 44, to produce any desired number of pulses from zero through nine in each cycle of operation of the four flip-flops, and a decimal code may be used in controlling the gate circuits directly from the tape reader.

Figure 6:
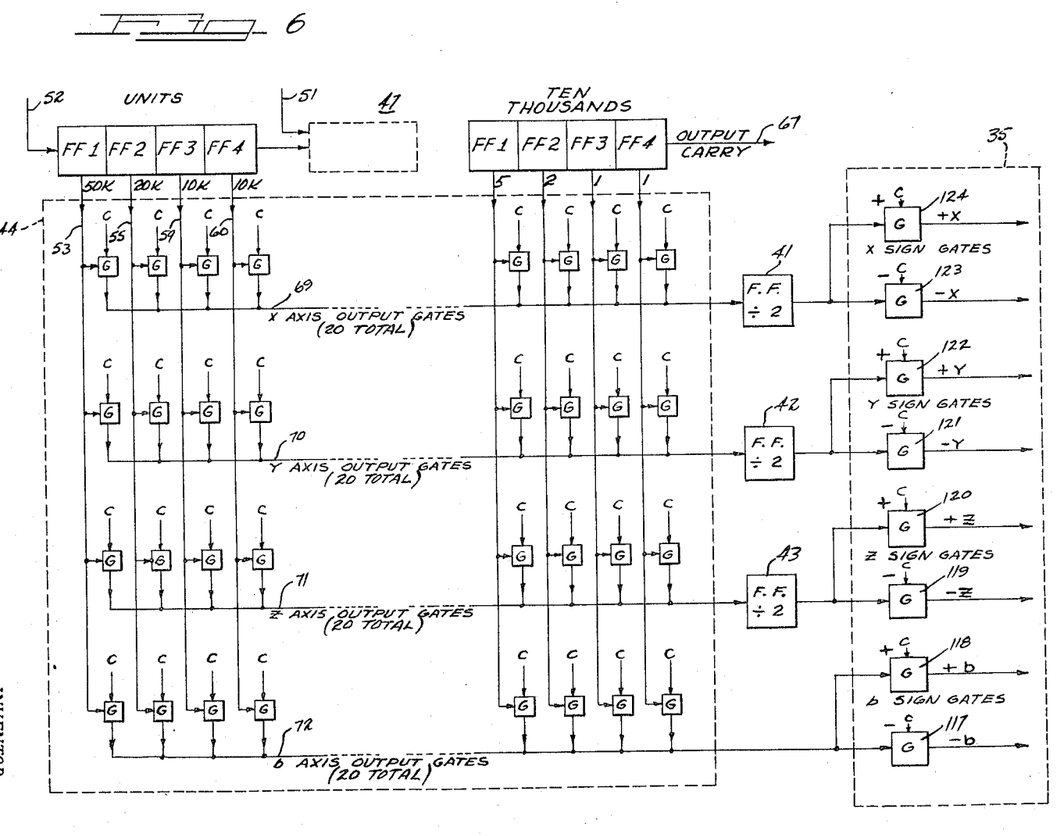
FIGURE 6 is a block diagram of a gating matrix used in the director, which forms another part of the pulse generator circuit of this invention.

Referring to FIGURE 6, it will be seen that the non-carry output line from each flip-flop or stage of each decade is connected to the input terminals of each of four gates, and that the control terminals of each of these gates are connected by control lines C to registers located in the final storage section 36 in such a manner that the gate connected to any storage element containing a one is enabled or open, whereas a gate connected to any storage element containing a zero is not enabled, or is closed. The output gates are thus effectively connected in a matrix array wherein the non-carry output terminal of one stage of the counter is connected to all of the gates in one column of the matrix and the bits encoding one of the four numbers $x$, $y$, $z$, or $b$ in final storage are respectively connected to successive gates in each respective row of the matrix. Furthermore, it should be noted that the connections for any given number such as $x$ are made in inverse magnitude relation. That is to say, the bits of the ten thousands digit in final storage control the output gates connected to the units decade of the pulse distributor counter, the bits of the thousands digit control the hundreds decade of the counter, etc. Finally, of course, the bits of the ten thousands digit control the units decade of the counter. The open gates will then pass a total number of non-carry output pulses corresponding to the number represented in final storage.

Furthermore, since none of the non-carry output pulses are ever time coincident, the outputs from these gates may be connected to a single line such as one of the lines 69, 70, 71, 72 so that the sum total of pulses appearing on a given line as the decade counter runs through its complete count will be equal to the associated number $x$, $y$, $z$, or $b$ controlling the gates feeding that line by the electrical states of the registers representing the number in the final storage element. Of course, it is necessary to provide a set of four such gates for each of the $x$, $y$, $z$, and $b$ axes for each decade. Thus, the matrix will consist of L rows and M×N colums, where L is here 4, the number of separate axes of motion, M is 4, the number of bits per digit, and N is five, the number of digits per character.

Turning now to FIGURES 4 and 5, it will be noted that output carry line 67 of the last decade of the pulse distributor 47 is connected to the reset input of a flip-flop 73 and that a line 74 is connected to the set input terminal of flip-flop 73. As shown in FIGURE 4, line 74 is connected to a movable switch contact 75 which may be engaged with a fixed contact 76 connected to a pulse source 77. The output of the flip-flop 73 is applied through a line 78 to a gate 79. A 20 kc. pulse signal is applied to the gate 79 through a line 80. Thus, a pulse may be applied from the pulse source 77 through contact 75 and line 74 to the flip-flop 73 to enable or open the gate 79, and a 20 kc. signal is then applied from line 80 through gate 79 to a line 81 which is connected to the clock cycle control 49. When the cascaded counters of the pulse distributor 47 have completed their count, the final end-carry output pulse which is applied from line 67 to line 68 is also applied to the reset input terminal of flip-flop 73 thus changing its state and thereby closing gate 79 so that the 20 kc. signal on line 80 is no longer applied to the clock signal control 49. Accordingly, the pulse distributor 47 will complete one cycle of operation in response to application of a pulse from line 74 to the set input of flip-flop 73, the cycle being completed when the final end-carry output pulse is applied to the reset input of flip-flop 73 from the line 67. In the meantime, the final end-carry pulse is applied through three delay circuits 82, 83 and 84 and a program stop circuit 85 to the line 74 to again initiate a cycle of operation after a certain delay. The purpose of the circuits 82–85 is described more in detail hereinafter.

During each cycle, the 20 kc. signal applied to line 81 is applied to a countdown chain of cascaded flip-flops 95, 96, 97, 98, 99 and 100 forming a part of the clock cycle control 49. Each of these flip-flops, of course, has an output the frequency of which is one-half of the frequency of its input since each flip-flop provides one carry output pulse for every two input pulses. The harmonically related signals thus available at the input and outputs of flip-flops 95 through 100, respectively, are supplied to a group of ten clock cycle control gates indicated in FIGURE 5 as the "A" gate, "B" gate, "C" gate, "D" gate, "E" gate, "F" gate, "G" gate, "H" gate, "I" gate, "J" gate, respectively. Thus, the 20 kilocycle input to flip-flop 95 is applied over a line 101 to the "A" gate and the "D" gate while the 10 kilocycle output of flip-flop 95 is applied over line 102 to the "B" gate and the "E" gate. The five kilocycle output of flip-flop 96 is applied over line 103 to the "C" gate and the "F" gate. The 2.5 kilocycle output from flip-flop 97 is applied over line 104 to the "G" gate, the 1.5 kilocycle output from flip-flop 98 is applied over line 105 to the "H" gate, the 625 cycle output from flip-flop 99 is applied over line 106 to the "I" gate, and the 312.5 cycle output from flip-flop 100 is applied over line 107 to the "J" gate.

The clock cycle code letter which is associated with each command and which is stored in final storage element 36 for the command being executed, is applied over a line 108a to a decoder 108. The output from decoder 108 is applied over a ten-channel cable 109, one channel of which is connected to the control terminal of one of the respective clock cycle gates as by control lines C–1, C–2, C–3, C–4, C–5, C–6, C–7, C–8, C–9 and C–0. Thus, if the command in final storage includes the clock cycle tape code letter "A," the inputs to the decoder 108 are so actuated that the output of decoder 108 will supply a signal which holds gate "A" open but which holds all of the other clock cycle gates closed. That is to say, only the particular clock cycle gate called for by the clock cycle code letter in final storage will be held open during the entire period of execution of the command, while other clock cycle gates are closed. Decoder 108 is essentially nothing more than a binary-decimal to decimal converter and includes circuitry all of which is well-known in the art. For example, the decoder may consist of a diode logic network including "and" circuits and "or" circuits. Such a network can be designed by well-known techniques of Boolean algebra to satisfy the above noted logical or functional requirements.

It is thus seen that if clock cycle code letter "A" has been read from the tape by tape reader 12 and transferred into final storage 36, the decoder 108 will have sent the letter "A" in final storage and the clock cycle "A" gate will be open while all other clock cycle gates are closed.

As soon as the start pulse is applied over line 74 to flip-flop 73 thereby opening gate 79 and applying the 20 kc. signal to the chain of flip-flop dividers in the clock cycle control 46, the 20 kc. input will be applied over line 101 through the open "A" gate and thence over line 51 to the trigger input terminal of the tens decade of the pulse distributor counter. The counter will then count ten thousand of the 20 kc. pulses and will thus emit the output carry pulse over line 68 exactly at the end of the one-half second interval. This same pulse also resets the flip-flop 73 thus shutting off the 20 kc. input to the clock cycle control 49 and the same pulse also is applied through the circuits 82–85 to perform various functions as described hereinafter which may include transfer of another command to the final storage section 36. Let us assume that the next command contains the clock cycle code letter "B." Decoder 108 now puts out a signal which opens the clock cycle "B" gate and closes all other clock cycle gates. Hence, the 20 kilocycle output from gate 79 is now passed through flip-flop 95 and the 10 kilocycle output of this flip-flop is applied over line 102 and through the "B" gate to line 51 and thence to the trigger input of tens decade. The counter will now take exactly one second to count ten thousand of the 10 kilocycle pulses before emitting its end-carry pulse which starts the process over again. Similarly, it will be seen that if the "C" gate of the clock cycle control is open a 5 kilocycle input is applied to line 51 and the pulse distributor counter will complete its count of 10,000 and emit its end-carry pulse at the end of exactly two seconds.

It will be noted, however, that each of the remaining gates "D" through "J" of the clock cycle control are connected over line 52 to the trigger input terminal of the units decade of the pulse distributor. Thus, if the "D" gate is open, the 20 kilocycle output from gate 79 is directly applied to line 52. The counter now, however, makes a count of 100,000 before emitting its end-carry pulse. Since the input pulses from gate "D" occur at the rate of 20,000-per-second, the count will be completed at the end of 5 seconds. Similarly, a 100,000 count of 10 kilocycle pulses from gate "E" is completed at the end of 10 seconds, the 100,000 count of 5 kilocycle pulses from gate "F" is completed at the end of 20 seconds, a 100,000 count of 2.5 kilocycle pulses from gate "G" is completed at the end of 40 seconds, a 100,000 count of 1.25 kilocycle pulses from gate "H" is completed at the end of 80 seconds, a 100,000 count of 625 cycle pulses from gate "I" is completed at the end of 160 seconds, and a 100,000 count of 312.5 cycle pulses from gate "J" is completed at the end of 320 seconds.

It is thus seen that the binary-decimal code for each of the letters "A" through "J" defined in FIGURE 4 and stored for each command in final storage unit 43 as shown in FIGURE 4 can, by means of the apparatus shown in FIGURES 5, 6 and 7, control the exact length of time during which a separate train of output pulses is emitted from pulse distributor 47 over line 46 for each of the four axes of motion channels x, y, z, and b. As suggested above, the exact number of pulses in each of these four pulse trains emitted over line 46 is controlled by the value of the associated number in final storage by virtue of the correspondence between the coding of the value of the coded numbers, x, y, z, and b, stored in final storage and the pattern of non-carry output pulses available from the various flip-flop stages of each of the decades of the pulse distributor counter as illustrated graphically in FIGURE 7.

Thus, turning to FIGURE 6 it will be seen as noted above that the non-carry output terminals 53, 55, 59 and 60 of the flip-flops of the units decade are each, respectively, connected to the inputs of four gates, one for each of the motion axes channels, x, y, z, and b. Similar connections are made for each of the other decades in the pulse distributor. The output of each of the x axis gates in the output gating matrix 44 is, in turn, connected over line 110 to the input of the divide-by-two flip-flop 41. Similarly, each of the outputs of the y axis gates are connected by a line 112 to the input of the divide-by-two flip-flop 42 and each of the outputs of the z axis gates are connected by a line 114 to the input of the divide-by-two flip-flop 43. The output of each of the gates in the b axis, however, is connected by the line 40 directly to the inputs of sign gates 117 and 118 controlling the b axis in the sign gate unit 35. The output of flip-flop 43 in the z channel is similarly connected to the z channel sign gates 119 and 120; the output of flip-flop 42 in the y channel is similarly connected to the inputs of sign gates 121 and 122 in the y channel, and the output of flip-flop 41 is similarly connected to the inputs of sign gates 123 and 124 in x channel. The reason for the interposition of divide-by-two flip-flops 41, 42 and 43 in the x, y, and z channels involves merely a matter of convenience in scale factor units which is not essential to the invention but which will be discussed below, after returning to a consideration of the overall operation of the output gating matrix 44.

It will be noted that output gating matrix 44 contains eighty gates and that the number of numeric bits contained in any command stored in final storage is also eighty. That is to say, there is a one-to-one correspondence between the gates of matrix 44 and the storage registers of final storage unit 36. Each of the gates in matrix 44 is controlled by an input signal applied over an input line each of which is labeled "C" in FIGURE 6. Of course, all of the gates connected to the x axes output channel are controlled by the numeric bits of the x number in final storage and similarly for each of the other channels. It should be recalled, however, that within a given channel there is an inverse relationship between the arrangement of the digits in the storage registers of final storage and the controlled output gates in the gating matrix. That is to say, for example, the four registers containing the four bits of the units digit of the x number are connected to control the four output gates from the ten thousand decade of the pulse distributor counter, whereas the four storage registers containing the binary representation of the ten thousands digit of the x number are connected to control the four output gates receiving non-carry pulse output from the units decade of the pulse distributor counter. The reason for this will be apparent from a consideration of FIGURES 5, 6 and 7. If, for example, the x number read into final storage in any given command calls for a motion of only 0.0008 inch, then only the gates associated with FF1, FF2 and FF4 of the ten thousands decade of the pulse distributor counter will be opened by the control signals applied over line "C" from final storage. No matter what clock cycle time has been specified, there will be only ten input pulses applied to the ten thousands decade, during one complete cycle. These input pulses will produce five non-carry output carry pulses from FF1, two non-carry output pulses from FF2, and one non-carry output pulse from FF4. These eight pulses are applied over line 110 to the associated closed output gate. Of course, if the x number in final storage is simply 0.0008, all gates of all other decades in the x channel will be closed by virtue of signals from the zero-containing registers coming to these gates over the control lines from final storage.

To take another example, let us assume that the x number in final storage is 7.0000 rather than 0.0008, thus calling for a motion of seven inches. The ten thousand digit registers of final storage are connected to the output gates controlling output from the units decade of the pulse distributor by control lines "C." Hence, the output gates associated with FF1 and FF2 of the units decade of the pulse distributor counter will be open and all other x gates will be closed. No matter what clock cycle time is specified from 5 to 320 seconds, corresponding to tape code letters "D" through "J," one hundred thousand pulses will be applied over line 80b to the input of the units decade counter at a rate and over a time period determined by the specified clock cycle tape code letter. FF1 of the units decade will thus produce 50,000 non-carry output pulses and FF2 will similarly produce 20,000 non-carry output pulses. All other non-carry output pulses produced by other flip-flops or other decades of the counter are, of course, blocked by the fact that the associated gates are closed by signals from final storage. The 70,000 non-carry output pulses from flip-flops 1 and 2 are applied over line 110 to the input of flip-flop 41.

It is thus apparent that if a clock cycle time of less than 5 seconds is called for, via clock cycle gates "A," "B," or "C," only a four-digit rather than a five-digit magnitude of motion can be specified since the outputs from the "A," "B," and "C" gates of the clock cycle control are applied directly to the binary input of the tens decade of the pulse distributor counter to measure these particular clock cycle time intervals. It will, of course, be understood, however, that this limitation is not inherently necessary to the invention but is simply one which is conveniently suited to the particular type of machine being controlled and is hence embodied in the particular illustrative circuitry shown. That is, in controlling this milling machine it would not be realistic to call for a motion of one inch or more (that is, a five-digit number) in less than five seconds.

It will further be understood that the same type of logic illustrated in the above examples dealing with the connection of the gates in the $x$ channel is also used in connecting the control lines to the gates of the other channels, i.e., to the $y$ axis channel, the $z$ axis channel and the $b$ axis channel in order to produce a predetermined number of pulses on these channels in accordance with the number in final storage.

The divide-by-two flip-flops 41, 42 and 43 are interposed in the $x$, $y$, and $z$ output channels, respectively, since although the numerical unit of tape coding for the particular illustrative embodiment of the invention is in ten thousandths of an inch, the servo-mechanism driving the hydraulic rams of the controlled machine is actually calibrated so that 0.0002 inch is the basic unit of measure for the motion caused by one input pulse from the $x$, $y$ or $z$ channels. The rotary motion of the work holder controlled by output signals from the $b$ channel, however, is actually calibrated in hundredths of degrees which corresponds to the coding initially used on tape. The manner in which the basic unit, or measure of distance, equals 0.0002 inch is determined by the servo-mechanism will be explained in detail below. It is here sufficient to note that the divide-by-two flip-flops 41, 42 and 43 serve to provide one output pulse for every two output pulses called for by the information as encoded on the tape so that the servo-mechanism, which moves 0.0002 of an inch for each pulse applied to it will, in fact, produce the motion actually called for by the tape. It should be further noted that the conversion of units provided for in this manner is purely a matter of convenience and that if the servo-mechanism were so designed as to have a basic unit of motion equal to the same basic measure or unit of information encoded on the tape, the flip-flops 41, 42 and 43 could be omitted.

Referring to FIGURE 6, it will be noted that the output from flip-flop 41 is applied to the signal input terminals of both the plus and minus $x$ gates 123 and 124, the output of flip-flop 42 is applied to the signal input terminals of both the plus and minus $y$ gates 121 and 122, the output of flip-flop 43 is applied to the signal input terminals of both the plus and minus $z$ gates 119 and 120 and the output from line 116 is applied directly to the signal input terminals of both the plus and minus $b$ gates 117 and 118. Each of these sign gates has a control line $c$ associated therewith, each control line being one channel of cable 61. It will, of course, be understood that, as is well-known, two output signals can be derived from any one flip-flop such as is used in the final storage element to represent each single sign bit. Thus if a particular flip-flop is in the one representing state (indicating a plus sign) one of its output terminals will have a relatively high voltage whereas the other of its output terminals will have a relatively low, or zero, voltage. On the other hand, if the flip-flop is in its zero representing state (indicating a minus sign) these conditions will be reversed and the first output terminal will have a relatively low voltage whereas the other output terminal will have a relatively high output voltage. Hence, by connecting each of the control lines $c$ of the $x$ sign gates to the appropriate output terminal of the flip-flop in final storage which stores the $x$ sign indicating bit, one of the sign gates may be held open and the other sign gate held closed in accordance with whether the stored bit is a one or a zero indicating a plus or a minus sign. Similar considerations, of course, apply to each of the other sign gates.

The outputs of the sign gates 117 through 124 are applied to phase modulators such as described above in connection with FIGURE 3, to produce phase leads or phase lags in the 200 cycle square wave command signals and to thereby control the respective servo systems. It is noted that the pulses in each train are substantially uniformly distributed over the time interval determined by the clock cycle control, which is important in achieving a gradual shift in phase of the 200 cycle square wave signals. This permits the servo systems to accurately follow the command signals without getting out of step.

Referring again to FIGURE 4, the program encoded on tape in the manner as discussed above in connection with FIGURE 2 is sensed by the tape reader 12 and converted to an electrical output in which a binary one (corresponding to a hole in the tape) is represented by the presence of a pulse on a given channel at a predetermined point in time and a binary zero (corresponding to the absence of a hole at a given point on the tape) is represented by the absence of a pulse at the corresponding predetermined point in time. This output is applied to director 10 over a cable 125 to a data distributor control section 126. The output of the data distributor control section 126 is connected through a cable 127 to an intermediate storage section 128 which is connected through a cable 129 to the final storage section 36. The data distributor 126 may, for example, consist of two cascaded ring counters each of which counts up to five and which together count up to twenty-five, i.e., the number of groups or characters in a complete block. The counter is driven by pulses generated by each separate incremental motion of a sprocket wheel or the like of the tape reader 12. These pulses are applied to the data distributor counters over a line 130. The counter, in turn, controls twenty-one sets of four gates each and four sets of one gate each so as to enable or open one set of gates for each particular count. The signals corresponding to sign information, i.e., those corresponding to group or characters 1, 7, 13 and 19 in FIGURE 2 require only single gates whereas the signals corresponding to numerical digits, i.e., those corresponding to groups or characters 2–6, 8–12, 14–18 and 20–24 are each fed through a four-gate set. The output of each set of gates is fed to one of twenty-five sets of flip-flops or bistable circuits, each set forming an individual slot or register in the intermediate storage section 128. Twenty-one of these registers have four flip-flops each to accommodate four bit digits whereas four of the registers are each single flip-flops to store the sign bits. The memory thus stores a total of eighty-eight bits of information.

In operation, the first of the twenty-five sets of gates is enabled or open while the tape reader is reading the first digit. Since the output of this set of gates is connected to the first register in intermediate storage, the signals corresponding to the first character or group are thus routed to the proper slot. This process is then repeated for each of the succeeding twenty-four characters. At the end of one block, the counter having reached a count of twenty-five emits a pulse over a line 131 which is applied to the tape reader 12 to stop the reading process.

After the signals corresponding to one block of information on the tape are stored in intermediate storage, a signal may be applied to a reset transfer line 132 connected to intermediate storage to cause transfer of the information stored therein to the final storage section 36 and at the same time to place the intermediate storage section 128 in its initial condition to be ready to receive signals corresponding to another block of tape. In initiating operation of the system, the signal may be applied to line 132 through a manually operated switch, not shown, and the signal may thereafter be applied automatically in a manner as described below.

After transfer of information to the final storage section 36, a start signal may be applied to the pulse distributor 47 through line 74, from pulse source 77 through switch 75. The pulse distributor then goes through a cycle of operation in the manner as above described, to cause generation of the pulse trains and to control the servo systems in accordance with information in final storage. At the end of its cycle of operation, the pulse distributor 47 emits the end-carry pulse which is applied through line 68, through delay circuit 82 and through a line 133 to the final storage section 36. The final storage section 36 is then reset to be in condition to receive another set of information from the intermediate storage section 128.

It should be noted that when the start pulse is applied from pulse source 77 through switch 75 and through line 74 to the pulse distributor as above described, a start pulse is also applied through a line 134 to the tape reader 12, to store the information in intermediate storage 128. When the pulse distributor thereafter completes its cycle of operation, the end-carry pulse is applied through line 78 and delay circuit 82 to the final storage reset line 133 and is then applied through delay circuit 83 to the reset transfer line 132 connected to the intermediate storage section 128. The information is again transferred from intermediate storage to final storage, and the intermediate storage section is placed in condition to receive another block of information. The end-carry pulse is also applied through the delay circuit 84 to the program stop circuit 85 to switch a flip-flop circuit therein, to apply a pulse to the line 74 to start the pulse distributor and to the line 134 to start the tape reader. When the tape reader completes reading of a block of information, it normally applies a reset signal to the program stop flip-flop circuit 85, so that it may again be switched in response to the next end-carry pulse applied thereto. However, the tape reader may be arranged to respond to a program stop code, so as not to apply the reset pulse to the circuit 85, and the operation of the system will then be terminated, until re-initiated by operation of the switch 75.

The operation of the system may be manually stopped by engaging the switch contact 75 with a fixed grounded contact 136. The switch 75 together with the pulse source 77 and other control switches, as well as signal lights, meters, etc., may be mounted within a console 137 as indicated diagrammatically in FIGURE 4.

To apply pulse signals to the clock cycle control 49 and to the phase modulator section 34, a 100 kc. master oscillator 138 is provided which may be a multivibrator connected to provide a square wave output having a frequency of 100 kc. This output is applied over leads 139 and 140 to pulse forming circuits 141 which differentiate the rectangular wave output in order to derive spiked pulses at the leading and trailing edges of each rectangular pulse. In practice, this may most conveniently be accomplished by deriving a rectangular wave output over line 140 which is 180° out of phase with the output derived over line 139 as illustrated in FIGURE 4 in the waveform inserts 142 and 143, respectively. Pulse-forming circuits 141 then differentiate the leading edge of each of such waveforms to derive pulse outputs as shown in FIGURE 4 in the waveform inserts 144 and 145, respectively. Thus, the point "A" in waveform 143 coincides with pulse "A" in waveform 145 and similarly point "B" in waveform 142 coincides with pulse "B" in waveform 144. By differentiating the leading edge of these out-of-phase waveforms, pulse-forming circuit 141 provides one output over a line 146 which consists of the "B" pulses illustrated in waveform 144 and a second output over a line 147 which consists of the "A" pulses illustrated in waveform 145. It will be apparent that there will be one "A" pulse and one "B" pulse for each cycle of the 100 kc. master oscillator output.

The "B" pulses developed on line 146 are applied through a line 148 to the phase modulator circuits 34, to be applied to line 33 of each circuit such as illustrated in FIGURE 3. Similarly, the "A" pulses developed on line 147 are applied to the phase modulator circuits 34, to be applied to the line 28 of the phase modulator circuit illustrated in FIGURE 3. The "B" pulses developed on line 146 are also applied through line 149 to the input of a frequency divider 150, which preferably operates as a divide-by-five divider to develop a 20 kc. pulse signal on the line 80 which is applied through gate 79 to the clock cycle control 49. It may here be noted that the train of output pulses developed through the pulse distributor 47 operating in conjunction with the gating matrix 44 is thus in phase with the "B" pulses which is desirable for proper operation of the phase modulator circuits.

The "A" pulses developed on line 47 may also be applied to a divide-by-five hundred frequency divider 151 to develop a reference signal which is applied to the sine wave generator 21 in FIGURE 1.

Referring to FIGURE 2, it may be noted that the coding of the holes in the tape may correspond directly with the arrangement of the gates in the gating matrix 44. For example, holes located opposite numeral 5 in the column at the left of FIGURE 2 may be used to control the gates associated with the "50K" output of the first counter, the "5K" output of the second counter, etc. Similarly, holes located opposite the numeral 2 in the column at the left of FIGURE 2, may be used to control the gates associated with the "20K" output of the first counter, the "2K" output of the second counter, etc. Thus the coding of the tape corresponds directly with the arrangement of the gates in the gating matrix. It is not, however, necessary that the 5, 2, 1, 1 code be used for both. For example, an 8, 4, 2, 1 coding may be used on the tape and the signals derived therefrom may be converted to a 5, 2, 1, 1 code to control the gates. The conversion may be accomplished between the tape reader and the data distributor control, between the data distributor control and intermediate storage, between intermediate storage and final storage, or between final storage and the gates. In any case, however, it is important that a decimal code be used in which the gates associated with each group of four flip-flops are controlled by one character or group of holes on the tape. For example, the gates associated with the first counter should correspond to groups 2, 8, 14 and 20 in the reading sequence as indicated in FIGURE 2. With this arrangement, the operation of the system may be readily checked and with the decimal code, the tape may be visually inspected to determine the coding thereon.

It will be understood that modifications and variations may be effected without departing from the spirit and scope of the novel concepts of this invention.

I claim as my invention:

1. In a pulse train generator, a counter circuit arranged to respond to a series of input pulses to periodically complete a cycle of operation, means in said circuit for generating four series of pulses in each cycle of operation thereof with the numbers of pulses in said series being selectively addable to produce any number from one through nine and with the pulses of each series being noncoincident with the pulses of each of the other a carry pulse to the next succeeding decade in response to application of every tenth input pulse to said counter circuit, and a common output circuit and four selectively operable gate circuits each associated with one of said series to apply the pulses thereof to said common output circuit.

2. In a pulse train generator, a plurality of counter circuits each arranged to generate four series of pulses in each cycle of operation thereof with the numbers of pulses in said series being selectively addable to produce any number from one through nine and with the pulses of each series being non-coincident with the pulses of each of the other series, means for operating said counter circuits in cascade with all except a final circuit being operated at a rate equal to ten times the rate of operation of the next succeeding circuit, a common output circuit, a plurality of gate circuits each associated with one of said series to apply the pulses thereof to said output circuit, and means for selectively controlling said gate circuits.

3. In a circuit for generating in a certain time interval a number of pulses corresponding to a plural digit decimal number, a plurality of counter circuits each arranged to generate four series of pulses in each cycle of operation thereof with the numbers of pulses in said series being selectively addable to produce any number from one through nine and with the pulses of each series being non-coincident with the pulses of each of the other series, means for operating said counter circuits in cascade with all except a final circuit being operated at a rate equal to ten times the rate of operation of the next succeeding circuit, a common output circuit, a plurality of groups of four gate circuits corresponding to said counter circuits, each gate circuit being associated with one of said series to apply the pulses thereof to said common output circuit, reading means operative to produce electrical signals corresponding to indicia located at certain positions in groups on a record medium, each group corresponding to a digit of said plural digit decimal number, and means responsive to said electrical signals to control said gate circuits with each group of gate circuits being controlled in accordance with the indicia positioned within one of said digit-representing groups of indicia.

4. In a pulse train generator, a plurality of counter circuits each arranged to generate four series of pulses in each cycle of operation thereof with the numbers of pulses in said series being selectively addable to produce any number from one through nine and with the pulses of each series being non-coincident with the pulses of each of the other series, means for operating said counter circuits in cascade with all except a final circuit being operated at a rate equal to ten times the rate of operation of the next succeeding circuit, a common output circuit, a plurality of gate circuits each associated with one of said series to apply the pulses thereof to said output circuit, reading means for reading blocks of indicia of a record medium for developing a group of electrical signals corresponding to each block of indicia, and a pair of storage registers, one of said registers being responsive to said electrical signals while the other controls said gate circuits in accordance with electrical signals obtained from a previously read block of information.

5. In a decade counter of the type comprising four cascaded bistable circuits connected to complete a counting cycle in response to ten input pulses, means to derive a non-carry output pulse from each of said four bistable circuits whenever said circuit changes its own state without omitting a carry pulse to change the state of the next succeeding bistable circuit in said counter, a common output circuit, a separate gating circuit associated with each of said bistable circuits respectively, each gating circuit being connected to apply the non-carry output pulses from its associated bistable circuit to said common output circuit, and means to selectively enable or disable each of said gating circuits.

6. Apparatus for producing a train of pulses equal in number to a stored decimal digit comprising first, second, third and fourth bistable binary storage devices forming a storage register to represent a decimal digit in a 1–1′–2–5 binary decimal code, four gate circuits connected to a common output circuit, means connecting each of said bistable storage devices to control a different one of said gate circuits so that said gate circuit is enabled only when said bistable storage device is in a binary-one representing state; a decade counter having first, second, third and fourth binary counting stages coupled in cascade to render each of said stages except the first operable in response to two operations of the next preceding stage, means coupled to the first stage of said counter for applying a sequence of input pulses thereto, and means intercoupling certain of said stages for causing the counter to complete a cycle of operation in response to ten input pulses, each of said binary counting stages having means to produce a non-carry output signal in response to each operation of said stage which does not operate the next succeeding stage in said cascade, means to apply said non-carry pulses from said first binary counting stage to the gate circuit controlled by said fourth binary storage device, means to apply said non-carry pulses from said second binary counting stage to the gate circuit controlled by said third binary storage device, means to apply said non-carry pulses from said third binary counting stage to the gate circuit controlled by said secondary binary storage device, and means to apply said non-carry pulses from said fourth binary counting stage to the gate circuit controlled by said first binary storage device, whereby the number of pulses appearing on said common output circuit during one cycle of said counter is equal to the decimal digit represented in said storage register.

7. Apparatus for producing a predetermined number of pulses in a predetermined time interval comprising, a plurality of decade counters connected in cascade, each of said decade counters comprising four cascaded bistable circuits connected to complete a counting cycle and emit a carry pulse to the next decade in said cascade in response to ten input pulses, means coupled to the input of the first decade in said cascade for applying a sequence of pulses of predetermined frequency, means actuated by the carry pulse emitted from the last decade of said cascade to stop the application of said input pulses, means to derive a non-carry output pulse from each of the bistable circuits of each of said decades whenever said bistable circuit changes its own state without emitting a carry pulse to change the state of the next succeeding bistable circuit, and means to apply all of said non-carry output pulses from preselected ones of said bistable circuits to a common output circuit.

8. Apparatus for producing in a predetermined time interval a train of pulses equal in number to a stored decimal number comprising, a plurality of storage registers, the content of each storage register representing one digit of said decimal number, each of said registers comprising first, second, third and fourth bistable binary storage devices, the states of said bistable storage devices representing a decimal digit in a 1–1′–2–5 binary decimal code, each of said storage devices being connected to enable or disable a separate gate circuit in accordance with the state of said bistable storage device, each of said gate circuits having its output connected to a common output circuit, a plurality of decade counters connected in cascade, means to apply a sequence of input pulses of predetermined frequency to the first decade counter in said cascade, each of said decade counters being connected to emit a carry pulse to the next counter in said cascade in response to ten input pulses, means actuated by the carry pulse emitted from the last decade counter in said cascade to stop the application of said input pulses to said first counter, each of said decade counters comprising four cascaded bistable circuits connected to complete a counting cycle and emit a carry pulse to the next succeeding decade in response to ten input pulses, means to derive a non-carry output pulse from each of said four bistable circuits whenever said circuit changes its own state without emitting a carry pulse to change the state of the next succeeding bistable circuit, and means to apply all of the non-carry output pulses from one of said bistable circuits to one of said gate circuits, said bistable circuits and said gate circuits being connected in inverse order of positional significance.

9. In a pulse train generator, a counter arranged to complete a cycle of operation in response to application of a certain number of input pulses thereto and comprising a plurality of counter circuits each arranged to generate four series of pulses in each cycle of operation thereof with the numbers of pulses in said series being selectively addable to produce any number from one through nine and with the pulses of each series being non-coincident with the pulses of each of the other series, and means for operating said counter circuits in cascade with all except a final circuit being operated at a rate equal to ten times the rate of operation of the next succeeding circuit, means for generating control pulses at a plurality of different frequencies, means for selectively applying said control pulses to the first counter circuit of said counter to control the duration of said cycle of operation of said counter, a common output circuit, a plurality of gate circuits each associated with one of said series to apply the pulses thereof to said output circuit, and means for selectively controlling said gate circuits.

10. In a pulse train generator, a counter arranged to complete a cycle of operation in response to application of a certain number of input pulses thereto and comprising a plurality of counter circuits each arranged to generate four series of pulses in each cycle of operation thereof with the numbers of pulses in said series being selectively addable to produce any number from one through nine and with the pulses of each series being non-coincident with the pulses of each of the other series, and means for operating said counter circuits in cascade with all except a final circuit being operated at a rate equal to ten times the rate of operation of the next succeeding circuit, means for generating control pulses at a plurality of different frequencies, means for selectively applying said control pulses to the first counter circuit of said counter to control the duration of said cycle of operation of said counter, a common output circuit, a plurality of gate circuits each associated with one of said series to apply the pulses thereof to said output circuit, reading means for reading blocks of indicia of a record medium for developing a plurality of groups of electrical signals in response to each block of indicia, means responsive to certain of said groups of electrical signals for controlling said gate circuits, and means controlled by another of said groups of signals for controlling said means for selectively applying said control pulses to said counter circuit.

11. In a pulse train generator, a counter comprising a plurality of counter circuits connected in cascade including at least a first counter circuit, a second counter circuit and a final counter circuit, all except said final circuit being operated at a rate equal to ten times the rate of operation of the next succeeding circuit, means in each of said counter circuits for generating four series of pulses in each cycle of operation thereof with the numbers of pulses in said series being selectively addable to produce any number from one through nine and with the pulses of each series being non-coincident with the pulses of each of the other series, means for generating control pulses at a plurality of different frequencies, means for selectively applying control pulses of one of said frequencies to either the input of said first counter circuit or the input of said second counter circuit, means controlled by said final circuit for cutting off the application of said control pulses upon completion of a cycle of operation of said final circuit, a common output circuit, a plurality of gate circuits each associated with one of said series to apply the pulses thereof to said output circuit, and means for selectively controlling said gate circuits.

12. In a signal generating system, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, means for generating control pulses at a plurality of different frequencies, and means for selectively applying said control pulses to said counter circuit to control the duration of said cycle of operation.

13. In a signal generating system, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, means for generating control pulses at a plurality of different frequencies, reading means for reading blocks of indicia of a record medium for developing a plurality of groups of electrical signals in response to each block of indicia, means responsive to one of said groups of electrical signals for controlling said fraction, and means controlled by another of said groups of signals for selectively applying said control pulses to said counter circuit to control the duration of said cycle of operation.

14. In a signal generating system, reading means for reading blocks of information encoded on a record medium with the use of predetermined binary decimal code and for developing a plurality of groups of electrical signals representing a decimal number in said binary decimal code in response to each block of information, the groups of electrical signals representing in said binary decimal code the respective decimal digits of said number, storage means for storing said plurality of groups of electrical signals representing said decimal number, counter units producing respective patterns of output pulses corresponding to the weights of respective code positions of said binary decimal code, an output gating matrix with individual gates thereof arranged to represent respective code positions in said binary decimal code and enabled or disabled in accordance with said groups of electrical signals contained in said storage means, and means to apply the output pulses of said counter units to the respective individual gates of said matrix in accordance with the weights of the respective code positions of said binary decimal code represented by said gates to generate a number of output pulses from said gating matrix in accordance with the decimal number represented by the groups of electrical signals in said storage means.

15. The signal generating system of claim 14 wherein the decimal number is encoded on the record medium with the use of a 1–1′–2–5 binary decimal code and the counting units have a 1–1–2–5 non-carry output pulse pattern in each cycle thereof.

16. In a circuit for generating a phase modulated signal, a frequency divider having an input and an output, a high frequency pulse source, gate means for feeding pulses from said source to said input of said frequency divider, a counter circuit arranged to complete a cycle of operation in response to application of a certain number of input pulses thereto, means associated with said counter circuit for generating in each cycle of operation thereof a train of output pulses equal in number to a controllable fraction of said certain number of input pulses, first and second selectively operable gates responsive to said train of output pulses, means for applying the output of said first selectively operable gate to add pulses from said train to pulses from said pulse source to create a certain phase lead in the output of said frequency divider, means responsive to the output of said second selectively operable gate for closing said gate means in response to pulses of said train of output pulses to create a certain phase lag in the outputs of said frequency divider, means for generating control pulses at a plurality of different frequencies, and means for selectively applying said control pulses to said counter circuit to control the duration of said cycle of operation.

17. In a signal generating system, a counter circuit arranged to complete a cycle of operation and to develop an end-carry pulse in response to application of a certain number of input pulses thereto, means associated with said counter circuit for generating in each cycle of operation thereof a train of output pulses equal in number to a controllable fraction of said certain number of input pulses, reading means for reading blocks of information of a record medium and developing a plurality of groups of electrical signals in response to each block of information, an intermediate storage register responsive to said electrical signals, a final storage register for receiving signals from said intermediate storage register, means coupling said final storage register to said counter circuit for controlling said fraction, a first delay circuit for responding to said end-carry pulse to reset said final storage register to an initial condition after a certain delay, a second delay circuit responsive to said first delay circuit for resetting said intermediate storage register to an initial condition and causing transfer of signals to said final storage register, and a third delay circuit responsive to said second delay circuit for initiating operation of said reading means to read a block of information.

18. In a signal generating system, a counter circuit arranged to complete a cycle of operation and to develop an end-carry pulse in response to application of a certain number of input pulses thereto, means associated with said counter circuit for generating in each cycle of operation thereof a train of output pulses equal in number to a controllable fraction of said certain number of input pulses, reading means for reading blocks of information of a record medium and developing a plurality of groups of electrical signals in response to each block of information, an intermediate storage register responsive to said electrical signals, a final storage register for receiving signals from said intermediate storage register, means coupling said final storage register to said counter circuit for controlling said fraction, a first delay circuit for responding to said end-carry pulse to reset said final storage register to an initial condition after a certain delay, a second delay circuit responsive to said first delay circuit for resetting said intermediate storage register to an initial condition and causing transfer of signals to said final storage register, a third delay circuit responsive to said second delay circuit for initiating operation of said reading means to read a block of information, a source of control pulses, and means responsive to said third delay circuit for applying said control pulses to the input of said counter circuit.

References Cited
UNITED STATES PATENTS

| | | | |
|---|---|---|---|
| 2,310,099 | 10/1957 | Townsend | 235—92 |
| 2,945,183 | 7/1960 | Hartke | 328—48 |

DARYL W. COOK, *Acting Primary Examiner.*

G. MAIER, *Assistant Examiner.*